United States Patent [19]
Roch et al.

[11] 3,874,205

[45] Apr. 1, 1975

[54] DIGITALLY CONTROLLED MULTIPLE DEPTH STOP AND RETURN STROKE LIMIT CONTROL FOR PRESS BRAKES

[75] Inventors: Gerald V. Roch, Indianapolis, Ind.; Edward H. Sonn, Westwood, Mass.

[73] Assignee: Hurco Manufacturing Company, Inc., Indianapolis, Ind.

[22] Filed: Feb. 19, 1974

[21] Appl. No.: 443,773

[52] U.S. Cl............................. 72/8, 72/22, 72/36, 72/441, 72/461
[51] Int. Cl............................................. B21d 5/02
[58] Field of Search .......... 72/7, 8, 21, 22, 36, 441, 72/461

[56] References Cited
UNITED STATES PATENTS

| | | | |
|---|---|---|---|
| 3,196,647 | 7/1965 | Schneider | 72/21 |
| 3,618,349 | 11/1971 | Roch | 72/8 |
| 3,824,822 | 7/1974 | Richardson | 72/36 |
| 3,826,119 | 7/1974 | Marotto | 72/461 |
| 3,835,683 | 9/1974 | Bradick | 72/36 |

*Primary Examiner*—C. W. Lanham
*Assistant Examiner*—Gene P. Crosby
*Attorney, Agent, or Firm*—Woodard, Weikart, Emhardt & Naughton

[57] ABSTRACT

A hydraulically driven press brake has an automatically positioned back gauge capable of changing workpiece gauging location after each bend. Variable ram closing stroke depth and variable ram return (opening) stroke length, is manually pre-programmable digitally by dial-in switches, and automatically coordinated with the gauge to provide the desired ram stroke depth for each bend in the workpiece and an appropriate subsequent length of ram return stroke. A rotary encoder monitors travel of the ram and supplies information to the control for the necessary positioning and coordination. Zero referencing is provided for the ram at closed condition, so all ram positions are designated by positive readings.

26 Claims, 9 Drawing Figures

DIGITALLY CONTROLLED MULTIPLE DEPTH STOP AND RETURN STROKE LIMIT CONTROL FOR PRESS BRAKES

BACKGROUND OF THE INVENTION

1. Field of the Invention

This invention relates generally to press brakes and more particularly to gauging the ram control means for hydraulic press brakes.

2. Description of the Prior Art

Automatic workpiece locating or gauging for press brakes is known, as shown in U.S. Pat. No. 3,618,349, issued to Gerald V. Roch on Nov. 9, 1971. It is also known to variably limit the depth of stroke of the ram of a hydraulic press brake to make bends of less than 90°, in a 90° die, for example, ("air bending"). Also it is known to provide a limit on the return stroke of the ram of a hydraulic press brake. Also there have been some efforts to combine workpiece locator gauge positioning with ram depth control by establishing in a group of limit switches, the different limits to which the ram is to descend. The various switches are electrically enabled successively for successive bends, in coordination with the gauge repositioning, to provide the proper depth of ram stroke for each bend. However, such apparatus for ram stroke depth control is not very convenient to use.

It is an object of our invention to provide better means for coordinating gauge location and ram stroke depth in a press brake. A further object is to provide means for also providing various optimum lengths of return stroke.

A further object is to provide means for a convenient referencing of ram position in one direction from the ram-closed position.

SUMMARY OF THE INVENTION

Described briefly, in a typical embodiment of the present invention, a control, readily adapted to convenience retrofitting to conventional hydraulic press brakes is provided with means for manually programming various desired limits to be reached by the ram during die closing the die opening operation for a series of bends in a workpiece. In addition to provision for predetermining different return stroke limits for different bends, by digital means, another feature of the invention is to provide zero referencing at the die closed condition. Also means are provided for coordinating the ram operations with automatic gauging. Programming by tape, card or casette or other means may also be used.

DESCRIPTION OF THE PREFERRED EMBODIMENT

Figure 1:
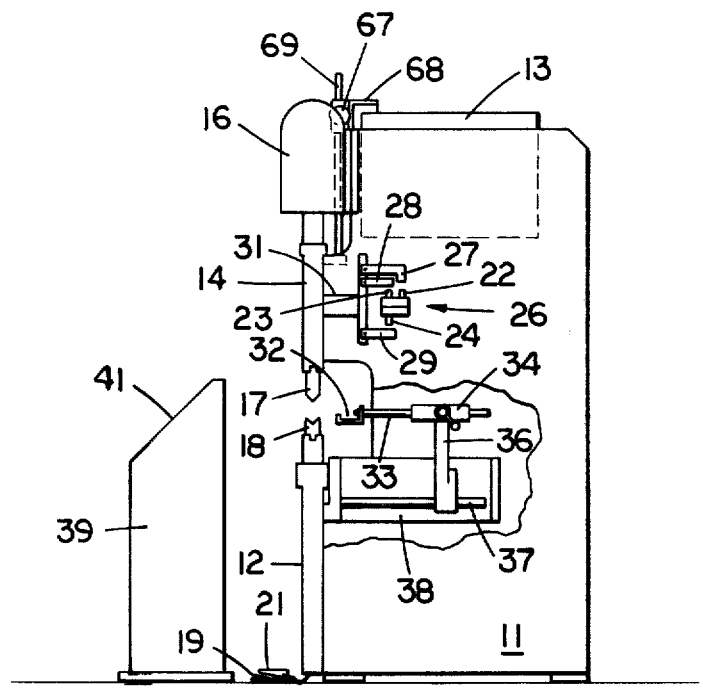
FIG. 1 is a schematic side view of a press brake incorporating a typical embodiment of the present invention.
Figure 2:
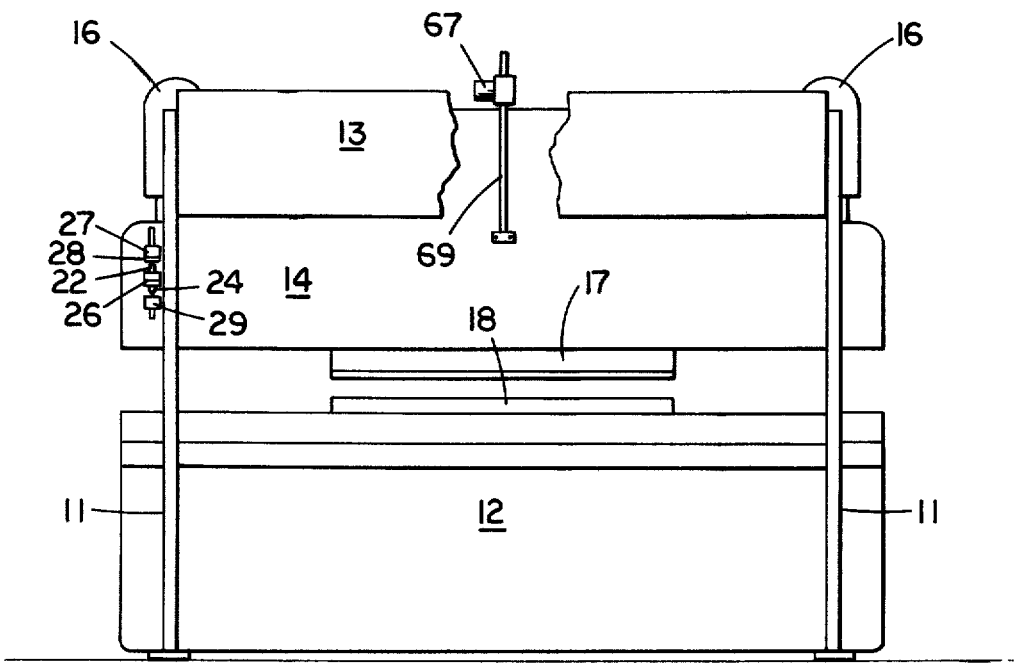
FIG. 2 is a rear elevation thereof.

Referring now to the drawings in detail, and particularly FIGS. 1 and 2, these figures show a conventional hydraulic press brake having side frames 11, a bed 12, and an upper cross member 13. The cross member 13 may be in the form of a box in which hydraulic pumps, cylinders and controls are mounted.

The press brake has a vertically movable ram 14 drivable upwardly and downwardly by hydraulic cylinder assemblies 16. The tooling includes an upper die 17 secured to the ram, and the lower V-shaped die 18 secured to the bed.

A foot pedal 19 located in the protective housing 21 is electrically connected to the press brake controls in the cross member housing 13. Also, a group of limit switches mounted to the side frame is connected electrically to the press brake controls. These limit switches include the bottom of stroke limit switch 22, which is actuated when the ram has closed the dies 17 and 18 to the extent needed for the bend to be made in the workpiece, and thereupon reverses the ram motion. The slow-down limit switch 23 is actuated by the ram during closure of the dies to slow the motion as needed to avoid hazardous conditions which might otherwise occur if the ram struck the work at high speed. The top of stroke limit switch 24 is actuated during opening of the dies to stop the upstroke of the ram before it has separated the dies too much for efficient use of time in the progress of the work. All of these limit switches are mounted to a bracket 26 affixed to the side frame 11.

To actuate the limit switches, limit stops are provided at 27, 28, and 29, to operate the switches 22, 23, and 24, respectively. These limit stops are mounted to a bracket 31 affixed to the ram 14. These limit stops are normally adjustable vertically, independent of one-another, to provide the ram stopping action and slow-down action wherever desired during the movement of the ram.

All of the components thus far described with reference to FIGS. 1 and 2, are conventional and can be found on many modern hydraulic press brakes manufactured and sold in the United States and other countries. Although such press brakes have various modes of operation, one mode is the "single-stroke control mode." In this mode, depressing the foot switch will move the ram down until the bottom of stroke limit switch 22 is actuated, whereupon the ram will return automatically to the point of actuation of the top of stroke limit switch 24, whereupon the ram will be stopped, even though the foot switch may remain depressed. Releasing the foot switch at any time during the descent of the rama, will cause the ram to immediately return to the top of stroke.

Other modes of operation may also be provided, and these would include a "continuous running" mode, or a "jogging" mode. In the former, as long as the foot pedal 19 is held down, the ram will continue to move down and up between the limits determined by the stop 27 and 29 until the pedal is released, whereupon the ram will return to the top position. In the jog mode, the ram will move down only while the foot pedal is depressed, and then will remain in whatever position it is when the foot pedal is released. This is all conventional.

The press brake shown in FIGS. 1 and 2 is equipped with an automatic back gauge. The back gauge serves to position the gauge bar 32 located behind the lower die 18, and mounted on arms 33 extending forwardly from brackets 34 mounted atop posts 36. Posts 36 are connected to a horizontal drive member 37 in the housing 38. The automatic positioning control for the back gauge 32 is located in the control housing 39 mounted in front of the press brake at a location convenient to the operator. Although it is shown facing directly to the left, it can be positioned at any angle for each reading and attention by the operator. The control housing has a control panel 41 thereon.

The above mentioned patent application describes one embodiment of such a back gauge and control. There are more recent models manufactured by Hurco Manufacturing Company, Inc. of Indianapolis, Indiana, the assignee of this patent application. Since this automatic gauge positioning apparatus is commercially available, the description thereof contained herein will be limited to some normal relationships between it and the ram control of the present invention.

Figure 3:
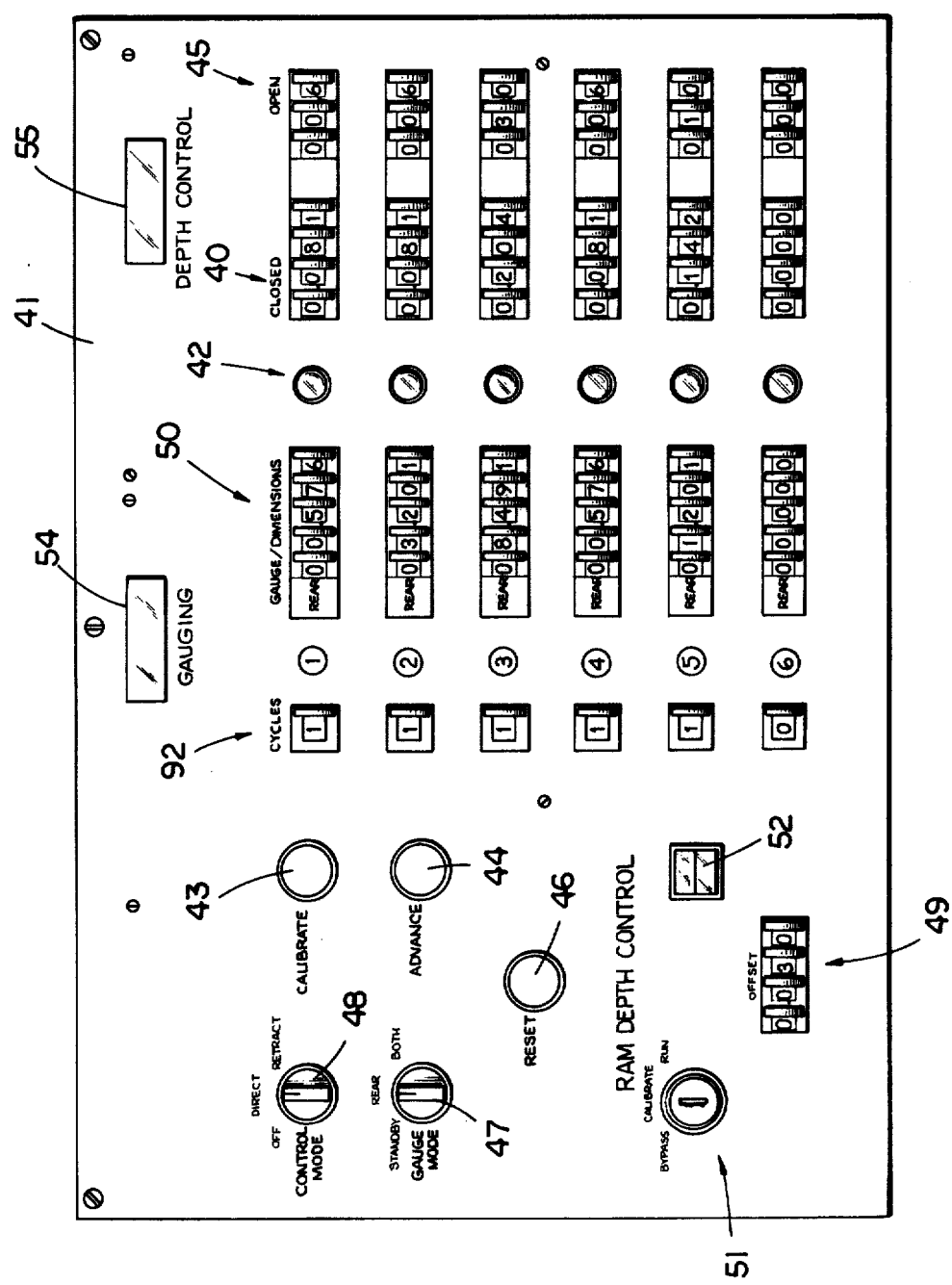
FIG. 3 is an enlarged front view of the control panel.

Referring now to FIG. 3, the front of the control panel 41 is shown. This panel includes an assortment of switches, buttons, lights and indicators. The switches of primary interest are thumb wheel switches located under a window identified "Depth Control." One set of these switches is arranged in six rows of switch groups in a column 40 under the "Closed" legend. A second set of these switches is arranged in six rows in a column 45 under the "Open" legend. In each group in column 40 there is a switch representing units, a switch representing tenths, a switch representing hundredths, and a switch representing thousandths of an inch. Each of these switches has an integer representing each of the ten possible switched positions of the switch, each position being detented and a thumb wheel immediately to the right of the corresponding integer being used to change the switch position manually. Of course, such switches are readily available commercially. The switches is these two sets under the "Depth Control" window are used for ram control according to a typical embodiment of this invention. The second set of thumb wheel switches is different only in the respect that each group in column 45 has three switches in it instead of four, and the units represented by them are different in the respect that they read in units, 10, and tenths of an inch.

Another set of thumb wheel switches is shown in column 50 below and to the right of the window identified "Gauging." They are arranged in six rows and four of the switches represent units, tenths, hundredths, and thousandths of an inch respectively, and the fifth switch represents whether a rear gauge is being used or, in the event the control and press brake are equipped for automatic operation of front gauges too, the fifth switch may designate a front gauge operation.

Another set of thumb wheel switches 49 is shown below and to the left of the window legend "Gauging." Each of these "offset" switches also in a ten-position thumb wheel switch like the others, and the position thereof determines how much compensation is put into the control to overcome coasting, compressibility, or other characteristics of the press brake influencing its behavior during ram closing at the die closed condition.

The cycle switches, also ten position thumbwheel switches, in column 92, determine whether gauge and ram control according to the three other sets of thumbwheel switches in that respective row, will occur only once, or more than once repetitively, during the processing of a workpiece. So it is seen that the condition of the switch in the column 92 designating "Cycles" is intended to determine the number of times that the ram and gauge are operated according to the dimensions entered by the thumbwheel switches in the three sets of switches in the same row as is the cycle switch. These rows are useful, therefore, in establishing a series of stations in a workpiece processing program. The indicator lights arranged in column 42, one for each station, are used to designate which station is in use at any particular time during the process of a workpiece.

Other features of the control panel include a "calibrate" button 43, used to establish a reference for the gauge position indicator reading on light emitting diode tubes behind window 54. The "advance" button 44 is used to advance the controller from one station to the next directly, without operating the ram to initiate the advance from one station to the next.

The "reset" button 46 returns the control directly to station 1. The gauge mode switch 47, which is a three-position switch, has a "standby" position in which neither the rear gauge nor the front gauge if there be a front gauge, is operated by the control, as it steps from one station to the next. The gauge mode switch also has a "rear" position, in which it controls only the rear gauge. It has a "Both" position, in which it enables the controller to control both front and rear gauges, according to the settings of the thumbwheel switches in the third set 50.

The control mode switch 48 includes an "Off" position in which the gauge control is inoperative. It has a "Direct" position for which a gauge will move from a position designated in the first station, directly to a position designated in the second station, upon advance of the controller. The control mode switch has a "Retract" position in which the control will cause the gauge to retract completely to its most remote position from the dies before moving from a position designated by one station to a position designated by the next station.

The operation of these switches, described with reference to the gauge positioning and control, will not further be described, because it is now known in the art and available in "Autobend" gauging systems marketed by the assignee of this application.

Some additional switches shown on the panel and of particular interest for this invention are the "offset" switches 49 mentioned above and located under the legend "Ram Depth Control." These switches are used to enter into the unit a number determined by experience and derived from performance of the particular press brake involved on the various kinds and thicknesses of workpiece materials used, in order to provide an electrical signal to the press brake control circuitry soon enough to compensate for coasting effects and stop the ram at the right location, and thereby provide the proper closure for the ram, at all stations, regardless of whether programmed for full depth bending operations, or for "air bending" operations where the dies are not closed completely, to make a bend less than the included angle in the V-die.

The "calibrate" switch 51 is key operated, and has a "bypass" position in which the control of this invention is disconnected from the ram controller of the press brake itself in the control housing cross member 13 of the press brake. The calibrate position of the switch is used for establishing the references during the beginning of operation. The "Run" position of the switch puts the controller of this invention in control of the ram controls in the press brake.

A condition indicator light unit 52 is provided with green and red lamps or lenses, to indicate whether the ram is in the calibrate mode (red lamp) or in the running mode (green lamp).

Figure 4:
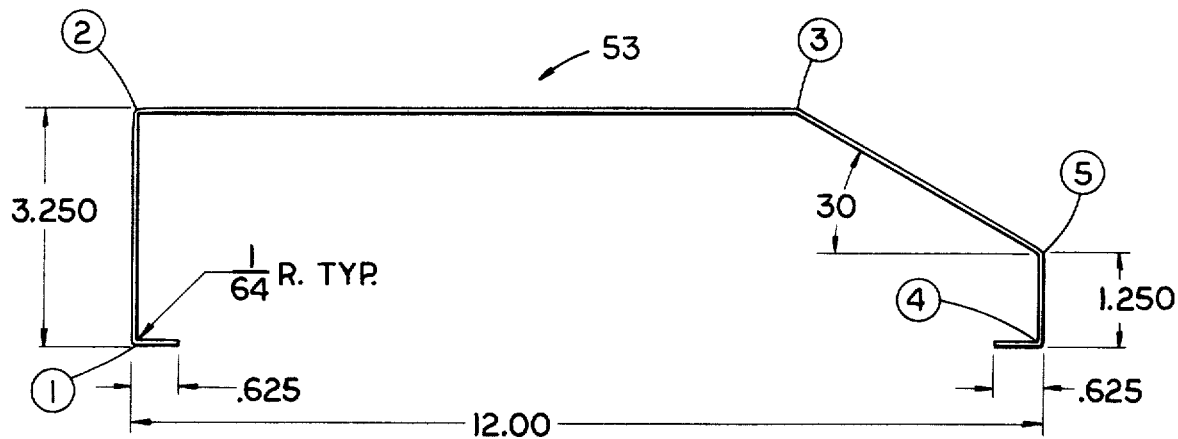
FIG. 4 is an edge view of a workpiece having a series of bends therein readily attainable with apparatus according to the present invention.

Referring now to FIG. 4, there is shown an example of a workpiece 53 formed from a flat sheet by a press brake. On this workpiece, the bends are indicated by numbers in circles 1, 2, 3, 4, and 5, thus indicating the sequence in which the bends are made on this particular workpiece. Also shown thereon are the dimensions in inches between various features of the workpiece. Although bends 1, 2, and 4 are right-angle bends, bends 3 and 5 are obtuse bends, and require "air bending" in a 90° V-die.

The dimensions to be dialed in both for the gauge and for the ram depth control in order to achieve the correct dimensions on the finished workpiece 53, are shown on FIG. 3 for the various thumbwheel switches involved. It will be observed that five stations of the control are used to accomplish these five bends, station 1 being for bend number 1 and continuing up through the stations for the four other bends.

It will be observed that the dialed-in gauge dimensions differ from the drawing dimensions by 0.049 inches. This difference can be determined at the outset by the calculation of a bend allowance determining the exact amount of metal required on the neutral axis centerline of the bend.

For the ram control of this invention, or initial calibration, the reset button 46 is pushed, the key switch 51 is set to calibrate, and the offset switches, ram-closed dimension switches and ram-open height dimension switches are manually operated. Pushing the reset button returns the control to station 1 both for the gauge and for the ram. Turning the key switch 51 to the calibrate position resets a true-position counter which will be referred to more fully hereinafter, to zero. The controls of the press brake themselves are placed in the set-up or jog mode and the ram is operated from the open position toward the closeod position for set-up. Although this can be done without the workpiece in the die, it is considered preferable to have the workpiece in the die for referencing directly from the expected ram-closed position during actual fulldepth forming operations. Then the ram is retracted, the ram depth control key switch 51 is turned to the run mode, and the ram closed and ram open dimensions are dialed-in, as is an appropriate offset dimension on the offset switches 49. This is a number which will be determined from experience with the press brake itself and is necessary to compensate for the coasting of the press brake ram which will occur following receipt thereby of the electric signals telling it to stop travel in the die closing direction.

The thumbwheel switch entries to be made in the ram closed column 40, will depend upon whether referencing is done with the workpiece in the dies or not. If it is done with a workpiece in a 90° V-die, then the entries for a 90° bend will be zero. For air bends, they will be something greater than zero, depending upon the included angle to be obtained in the workpiece, the thickness of the workpiece its resiliency, and other factors affecting the result of a certain extent of die closure on the workpiece. The appropriate dimensions to be dialed in can be determined readily by experimenting with a workpiece to obtain the desired included anagle, during set-up.

Figure 5:
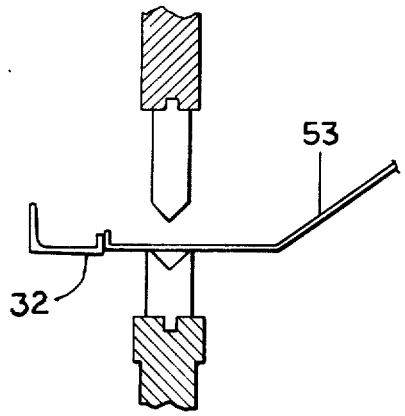
FIG. 5 is a fragmentary view of the workpiece in position in the press brake, for one of the bends.
Figure 6:
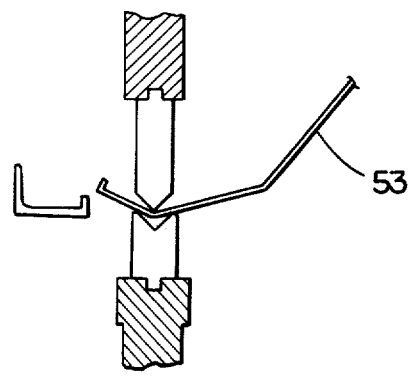
FIG. 6 is a view like FIG. 5 but showing the ram in a closed position during an air bend.
Figure 7:
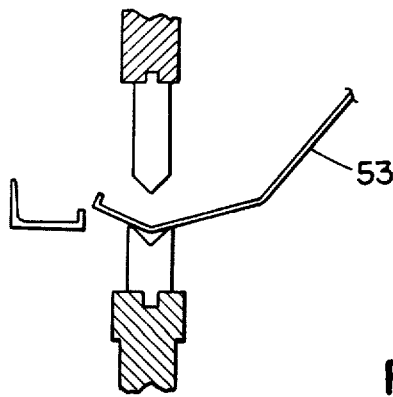
FIG. 7 is a view like FIGS. 5 and 6 but showing the ram in an open position after the air bend and ready for removal of the workpiece.

If the referencing is done without the workpiece in the die, then the figure to be dialed-in for a 90° bend in a 90° die, will also depend on the characteristics of the material. For example, on a 16-gauge sheet it may be 0.081, as indicated in FIG. 3 for the stations where the 90° bends are to be made. The larger dimensions for the obtuse angle bends 3 and 5 are shown at stations 3 and 5 in the unit. FIGS. 5, 6 and 7 show the workpiece in place before bend number 5, during bend number 5, and following bend number 5, respectively.

Figure 8:
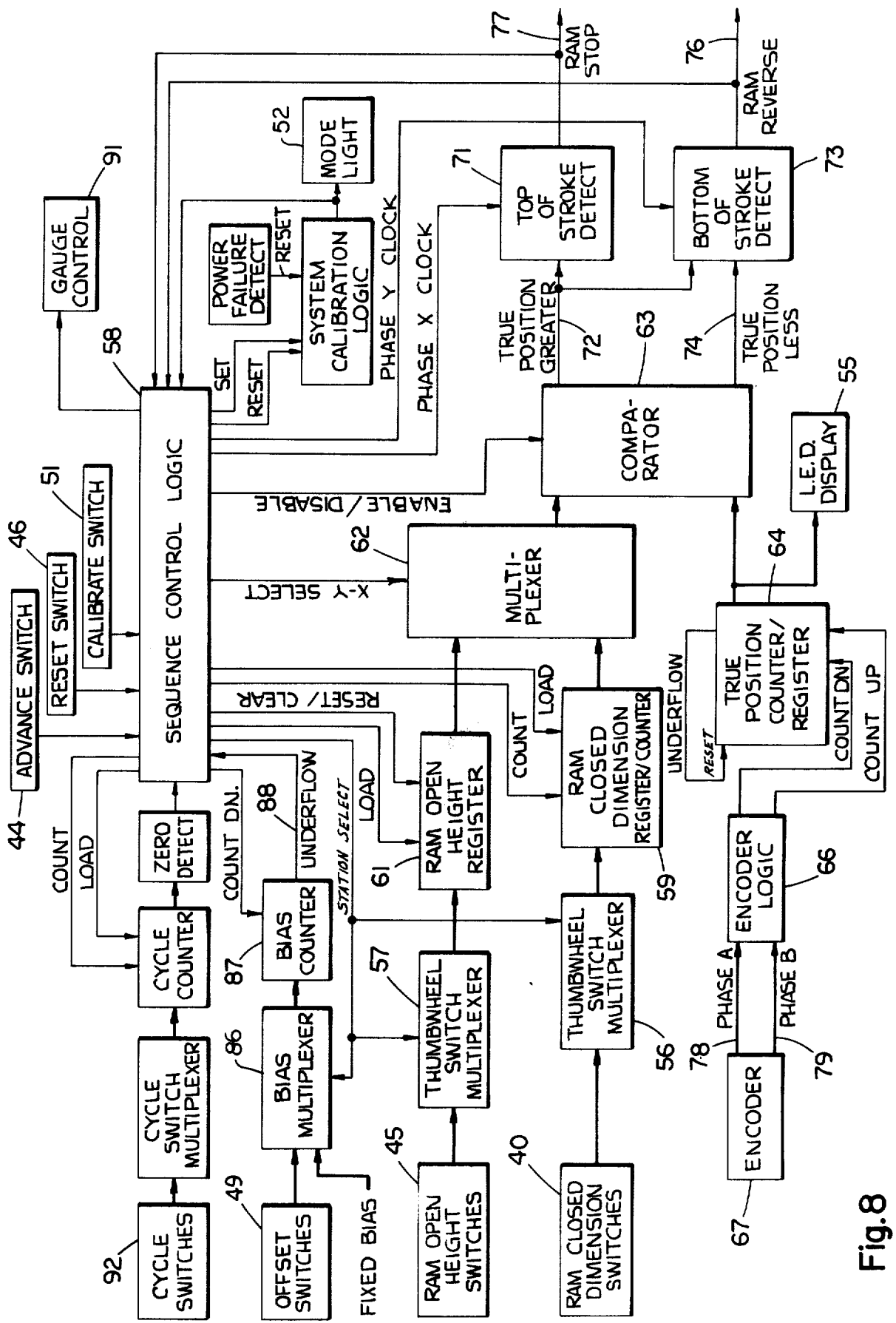
FIG. 8 is a logic diagram.

Referring now to FIG. 8, which is the logic diagram, the entire set of ram-closed dimension switches appearing in column 40 on the control panel 41 of FIG. 3, is included in the block 40. Likewise, the entire set of ram-open height switches shown in column 45 on the control panel 41 of FIG. 3, is included in block 45. The outputs of these switches are coupled to thumbwheel switch multiplexers 56 and 57, respectively, these multiplexers also having inputs from the sequence control logic 58. The output of the thumbwheel switch multiplexer 56 is coupled to a ram-closed dimension register/counter 59, and the output of the multiplexer 57 is coupled to the ram-open height register 61. The outputs of these registers are coupled to a multiplexer 62. The output of this multiplexer coupled to a comparator 63 which also has an input from a true-position counter/register 64 having an input from an encoder logic 66 coupled to encoder 67. Encoder 67 is a rotary encoder having two pulse train outputs, phase A and phase B, with a ninety degree phase difference. It can be seen in FIGS. 1 and 2 mounted by a suitable bracket 68 to the cross member 13 of the press brake. The encoder being a rotary encoder, is driven by a hardened and ground rod 69 affixed to the rear of the press brake ram 14 and movable up and down through the encoder housing as the ram moves up and down. The encoder includes a wheel which runs on the rod, thus driving the encoder to produce the output, which is a two-phase output, to the encoder logic 66 of FIG. 8. Referring further to FIG. 8, wherein heavy lines generally represent data lines and light lines generally represent control lines, registers 59, 61, multiplexer 62 and comparator 63 have inputs from the sequence control logic.

There is a top of stroke detector 71 having inputs from output 72 of the comparator 63 and the sequence control logic. A bottom of stroke detector 73 has inputs both from the outputs 72 of the comparator and output 74 of the comparator and the sequence control logic. The outputs of the top of stroke detector 71 and the bottom of stroke detector 73 are both connected back to the sequence control logic. Also, the output 76 of the bottom of stroke detector is connected to the press brake control circuitry in parallel with the bottom of stroke limit switch 22 of FIGS. 1 and 2. The output 77 of the top of stroke detector is connected in parallel with the top of stroke limit switch 24 of the press brake of FIGS. 1 and 2. So it is that the control of the present invention simply takes the place of the functions of the limit switches 22 and 24 of the standard press brake. Those limit switches are in a sense disabled, by simply positioning the operating stop 29 for the top of stroke limit switch 24 just low enough that during normal control of the press brake by the control of the present invention, the ram will never rise far enough to cause stop 29 to actuate limit switch 24. On the other hand, leaving the limit switch in parallel with output 77 of the present invention, limit switch 24 can still serve to stop the rise of the ram if for some reason the present invention would fail to stop it before limit switch 24 is actuated by the stop 29. Similarly, by simply raising the stop 27 in FIGS. 1 and 2, with respect to the ram, descent of the ram will not be controlled by limit switch 22. However, it is recommended that the stop 27 be positioned such that if the control of the present invention failed to stop descent of the ram at the lowermost acceptable depth, switch 22 would be actuated by stop 27 and cause the ram to return. This is particularly feasible where the control of the present invention is set-up with the workpiece in place. Thus, if the ram descended below the full depth it should have with the workpiece in place, it could trigger limit switch 22 set for operation just below the full depth desired.

Figure 9:
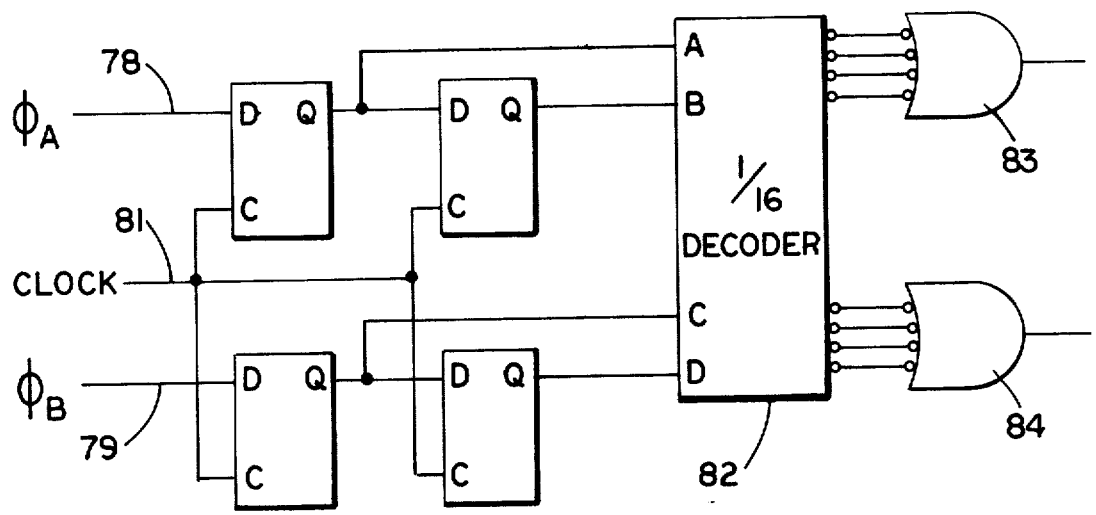
FIG. 9 is a schematic diagram of the encoder logic.

FIG. 9 is a schematic diagram of the encoder logic 66 of FIG. 8. It includes inputs 78 and 79 which are the phase A and phase B inputs from the rotary encoder 67. It also has a clock input at 81 and it is preferable that the clock rate by high comparison with the signal output from the motion to be detected. As it is desired to detect linear motion wihtin 1/1,000 of an inch, the clock rate selected was 500 KHz. By the use of the flip-flops in the arrangement shown, these being D-type flip-flops, and a 1 out of 16 decoder 82, and two four-input NOR gates 83 and 84, one unit of a clockwise motion will be represented at the output of the gte 83, while one unit of a counterclockwise rotation of the encoder will be represented at the output of the gate 84. If no motion occurs, the outputs of both gates 83 and 84 are "false." Accordingly, in this encoder, by comparing a sample at one time with the previous sample, it is possible to detect the motion of the encoder, and also its direction, in a very reliable, noise-insensitive way, producing an appropriate digital output to the true position counter 64.

Referring further to the logic diagram, the ram open height register 61 is a three digit unit storing the settings of the shut-height switches of that one of the six stations which is in control of the ram at any given time, as determined by the output from the sequence control logic to register 61. The ram closed dimension register/counter 59, having a five digit capacity, stores the setting of the ram closed dimension switches for the particular station, the setting being adjusted in operation by the setting of the offset switches 49 through their multiplexer (MUX) 86, bias counter 87, underflow output 88, through the sequence logic.

The multiplexer 62 selects, on alternate phases of the phase X, phase Y clock employed with this invention, the ram open height register 61 or the ram closed dimension register 59, for input to the comparator 63.

It was mentioned above that the output of the encoder logic 66 is coupled to a true-position counter/register, 64. This is a five-digit counter which is basically conventional except that it is dead-ended, i.e, it is never permitted to counter below zero. As soon as an underflow is detected, a zero is put back into the counter. It is used according to one feature of this invention for referencing the full depth of the ram stroke, so that all ram-closed dimensions will be positive, thus facilitating the set-up and adding to the safety aspect of the unit. After being referenced according to the calibration procedure to be described hereafter, this counter will always maintain the true position of the moving die relative to the stationary die.

It was mentioned above that the clock is a two-phase clock. It provides two signals which are 180° out of phase with each other and which are referred to as phase X and phase Y. They clock all the logic within the ram control of this invention. They do not clock the gauge control. The only reason the gauge control 91 is shown in FIG. 8, is to indicate that it is coordinated with the ram stroke depth control of the present invention by a signal from the sequence control logic 58 to the gauge control after the ram has reached the bottom of its stroke, to tell the gauge control to move the gauges to the next gauging position for the next station.

The cycle control switches in column 92 of FIG. 3 deterine whether or not the system will say at station 1 for only one closing stroke of the ram, or will remain there for up to a total of nine closing strokes, of the ram, before the system advances to the next station. Of course, when the depth control advances to the next station, so does the gauge control.

The comparator 63, is a five-digit unit performing an arithmetic comparison between the output of the true-position counter/register 64 and the ram-closed dimension register/counter output (for a phase Y-clock signal) or between the output of the true-position counter/register 64 and the ram-open height register 61 (phase X-clock signal). During the latter comparison, the two least significant digits of the comparator are disabled.

The top of stroke detector 71 is set whenever the comparator 63 as the phase X-clock pulse determines that the contents of the true-position counter are greater than the contents of the ram-open height register 61. It thereupon produces an output at 77 commanding the ram to stop die opening travel, just as the top of stroke limit switch 24 on the press brake itself would do if the control of this invention were not employed.

Similarly, the bottom of stroke detector 73 is set during a phase Y-clock signal whenever the count of the true-position counter 64 is less than the content of the ram-closed dimension register, to produce an output at 76 commanding the ram to return to the open condition. Thus, it performs the function that would otherwise be performed by the bottom limit ssitch 22 of the press brake of FIG. 1 if the control of this invention were not employed. In addition, however, this output is maintained at 76 until the ram has reached the full open condition, as a safety measure.

The bias counter is a three-digit counter into which the conditions of the bias or offset switches 49 are loaded. Then, during operation, at each station, the bias counter is counted to zero. The dimension 59 is simultaneously counted up or down (depending on whether the sign of the offset is plus or minus) until underflow is detected from the bias counter 87. Thus, the dimension register content is adjusted by the amount of the offset during this time. As is true of the true position register/counter, the dimension register/counter is not permitted to count below zero. This is an added safety feature, avoiding possible damage to dies which might otherwise occur if an erroneous minus offset were manually entered.

Also in the sequence control logic there is a state counter and decoder. An example of the listing of states to be considered and noted will be included hereafter. Suffice is to say at this point that the general function of the state counter is to determine at any time with respect to the press brake and gauge and ram control, what has happened, what is happening, and what is to happen next. At each period of the clock, various conditions are tested to determine what will be the next state.

Also included in the sequencne control logic is a station counter and decoder. This merely selects one of the six stations on the control panel and, by means of the thumb-wheel switch multiplexers, brings the proper data from the control panel switches into the logic for the particlar station selected.

The example of the state chart is as follows:

| STATE | ACTION | NEXT STATE |
|---|---|---|
| 0 | Calibrate only | 1. If calibrated |
| 1 | Seek next selected station | 2. If station is selected |
| 2 | Ram-closed dimension setting goes to dimension register; offset goes to bias counter; reset the ram reverse command | 3. Unconditional |
| 3 | Bias counter minus .001 goes to bias counter; dimension plus or minus .001 goes to dimension counter until underflow | 4. When bias counter underflows |
| 4 | Fixed bias goes to bias counter | 5. Unconditional |
| 5 | Bias counter minus .001 goes to bias counter dimension plus .001 goes to dimension until underflow | 6. When bias counter underflows |
| 6 | Wait til bottom of stroke | 7. If bottom of stroke |
| 7 | Ram-open height setting goes to ram-open height register; advance gauge control | 8. Unconditional |
| 8 | Set bottom of stroke detector for ram reverse command; cycle-1 goes to cycle counter | 9. Unconditional |
| 9 | Wait for top of stroke | 1. If new station<br>2. If repeat station when top of stroke has been reached |

CALIBRATION PROCEDURE

For each different set of forming tools to be used in the press brake, calibration should be done. For this purpose, control switch 51 should be turned to the calibrate mode and the reset button 46, pushed. While it was mentioned above that the calibration can be done with the workpiece in the dies, it can also be done with the workpiece out, and the latter procedure will be described at this point. With the press brake controls in a jog or set-up mode, the forming tools (dies) are closed together to a predetermined light tonnage, and then the ram is retracted by releasing the foot pedal or by returning the press brake control to a running mode, as the case may be, depending upon the particular press brake involved.

As indicated above, the true position counter is dead ended so that it can never count below zero, even while the counter is counting down as the dies are closed. Whenever an underflow is detected, a zero is put back into the counter. By setting this counter to zero, upon placing switch 51 in the calibrate mode, and stroking the ram until the dies close, the true position counter is absolutely referenced at zero without any external commands or measuring tools. It maintains this calibration until shut-off, or recalibrated. (When power goes off, whether intentional or accidentially, the machine detects it, and the machine must then be recalibrated. This is a safety precaution.) Therefore, as the dies are separated, the true position counter always counts up, thereby always measuring the separation of the dies. Therefore, according to this invention, it is easy for the operator to dial-in the exact depth dimensions he is interested in, knowing that they always represent the amount of separation of the dies. It can be seen, for example, by reference to FIG. 3, that the depth dimension entered in the switches is column 40 for the ram closed positions represent, for bends 1, 2, and 4 on the part, the approximate thickness of the metal, with accommodation for the angle of the bend being made which, in this instance, is 90°. These dimensions can be readily provided on charts for the use of the operator, listing the dimensions by metal gauge thickness, and angle of bend desired, for a given size of die. Where air bending is to be accomplished, the dimension will be greater, depending upon the size of the angle, as exemplified by the dimension at station 5 for the 120° bend, and the dimension at station 3 for the 150° bend.

DESCRIPTION OF OPERATION

After the ram has retracted during the calibration mode, the control switch 51 is turned to the "run" mode position. Then all the programmed dimensions are dialed in, including the closed and open dimensions for the depth control, the gauge selection and dimensions, and the offset dimension, as well as the cycle selections by switches 92. The logic acquires the first station selected by the cycle switch thumbwheel having been set to the number 1 or a higher number, and the dimensions for that station are read into the ram closed dimension register. The gauge control, which will not be described further herein also performs similar functions to locate the gauge at the appropriate dimension for the first selected station.

As the ram closed dimension is read into the dimension register, it is also adjusted by the offset in accordance with the offset switch setting. The procedure is outlined at state 3 in the foregoing state chart. The bias counter is counted down by 0.001. At the same time, the dimension counter is counted up or down by 0.001, depending on the sign of the offset. If not underflow of the bias counter is detected, the bias counter is counted down again by 0.001 and so is the dimension counter counted up or down again by 0.001. If no underflow is detected, this procedure is continued until an underflow is detected, whereupon the dimension register content has been adjusted according to the offset switch setting, and the sequence control logic advances to the next state. States 4 and 5 can be used if it is desired to put in a fixed positive offset (bias) as a safety precaution to allow for metal thickness and avoid damage which could otherwise be caused as a result of failure of the operator to consider metal thickness when dealing in dimensions after calibrating without the workpiece in the press brake dies.

The logic then monitors the relationship of the true position counter to both the ram closed dimension register and the ram open height register. At that time the ram open height register has been set to zero. Then, as the ram closes, the true position counter counts down, always containing a count representing the true position of the ram, always above the zero reference. When the ram reaches the desired end of the closing stroke, as sensed by the true position counter, count therein becoming less than the content of the ram closed dimension register, a command is sent from the output 76 to the press brake control to reverse the ram. At this time, the ram open height register is loaded and the ram reverse command on output 76 is maintained until the top of stroke detector is set by the the count of the true position counter being greater than the content of the ram open height register as noted by the comparator 63. Then reverse command on line 76 is released. Also, if at the time of initation of the ram reverse command, the cycle control is not set to a number 2 or greater to indicate a repeat, the gauge control is commanded to advance to the next station.

The ram open height register content is maintained until the next bottom of stroke output signal, so that the opening motion of the ram may be arrested at any time the ram is commanded to open to a distance greater than the setting of the ram open height register. This is according to the feature of the invention which enables limitation of the amount of the return stroke after each bend, to nothing more than what is essential to be able to conveniently move the workpiece. For example, as shown in the diagram on FIG. 3, the settings of the switches in column 45 are such that, after the bends 1, 2 and 4, the dies will separate to only 6/10 inch, which is enough to move the workpiece toward the rear for the next succeeding bend, while at the same time keeping the dies close enough together to provide an added measure of safety for the operator and also reduce the ram stroking time. On the other hand, following the bend number 2, when the workpiece must be removed from between the dies, in order to reposition it for bend number 3, the dies will separate three inches. Similarly, between station 5 and return to station 1 for the first bend on the next workpiece, the dies separate to a dimension of one inch, to permit removal of the finished workpiece. In this instance, as noted by the condition of the cycle switch for station 6, being set at zero, that station is not to be used, and the control will promptly return to station 1 following completion of the bend at station 5.

The present invention provides a convenient way of controlling the ram of a press brake, regardless of whether or not automatic gauging is used. Yet, it is fully compatible with automatic gauging. Also, it conveniently fits into the modus operandi of conventional press brakes employing conventional limit switches to limit ram travel in both directions. It is also readily adaptable to the well-known type of hydraulic press brake in which it is the lower die that moves up and down, as the outputs from the control can be used to operate air cylinders controlling clamps or valves on that type of press brake.

In that particular press brake, some additional logic can be provided if desired to avoid release of a closed dimension clamp, if a station setting is to be repeated.

What is claimed is:

1. Apparatus for controlling the ram of a hydraulic press brake during the procedure of making a series of bends in a workpiece; said apparatus comprising:

manually operable establishing means for establishing a program for variably limiting the travel of a ram of a press brake, said establishing means being arranged in a plurality of stations separately assignable to workpiece bends having different parameters, said establishing means including a first set of manually operated switches for ram closing control and a second set of manually operated switches for ram opening control;

first and second signal outputs, said first output being for a ram closing limit signal and the second output being for a ram opening limit signal;

ram position indicating signal generating means having an output;

and signal comparing means having inputs coupled to said gnerating means and to said switches for detecting a match between signals from said generating means and signals from said switches during opening and closing movement indicating signals from said signal generating means, to generate a ram stop signal at said first output when a match is made during indication of ram closing movement, and to generate a ram stop signal at said second output when a match is made during indication of ram opening movement.

2. The controller of claim 1 wherein:

said first set of switches is arranged in a first plurality of groups of switches, one group for each of said stations, a different group of said plurality being provided for control of the ram during the making of each bend having ram operating requirement parameters different from those of the next preceding bend, and said second set of switches is arranged in a second plurality of groups of switches, one group for each of said stations, a different group of said second plurality being provided for control of the ram during the making of each bend having ram operating requirements parameters different from those of the next preceding bend, the combination further comprising:

signal repetition selector means including a manually operable multi-position selector switch for each of said stations, for selectively repeatedly producing a ram stop signal at a position limit set by one of said sets of switches of said first set.

3. The apparatus of claim 1 wherein:

means are coupled to said ram position indicating signal generating means, to establish a count reference at zero upon reversal of ram movement from a closing direction, all ram movement in an opening direction thereby being represented by forward counts from zero, whereby settings of said first and second switches are all referenced positively from zero.

4. The apparatus of claim 1 and further comprising:

a hydraulic press brake having a ram controller including ram closing limit switch and a ram opening limit switch, said first output being coupled to said press brake ram controller in parallel with said ram closing limit switch, and said second output being coupled to said press brake ram controller in parallel with said ram opening limit switch.

5. The apparatus of claim 1 and further comprising:
means for establishing a program for variably limiting the travel of a workpiece stop gauge mountable on the press brake, and including a third set of manually operated switches for gauge positioning control.

6. The apparatus of claim 5 wherein:
said third set of switches is arranged in a plurality of groups of switches, one group for each of said stations, said plurality being provided for control of the gauge means during the making of each differnt bend, the groups of said third and fourth switches being arranged to correspond whereby for each station, there is a group of said first switches, a group of said second switches, and a group of said third switches.

7. The controller of claim 6 wherein said switches are thumbwheel operated switches having indicator digits directly associated therewith, each switch having digits zero through nine thereon representative of ten different switch conditions manually selectable.

8. The apparatus of claim 1 wherein:
said ram position indicating signal generating means include a counter unable to count under zero.

9. The apparatus of claim 8 and further comprising:
calibrate means coupled to said counter for entering and holding a zero in said counter during application thereto of an input such as to ordinarily cause said counter to count down.

10. The apparatus of claim 9 wherein said ram position indicating signal generating means include:
an encoder having a portion adapted to mounting on a press brake ram and a portion adapted to mounting on a press brake frame for producing on two outputs, signals having a phase difference between them useful for detecting relative movement between said portions;
and means for detecting the directions of relative movement between said portions.

11. A method of making a series of bends on a workpiece in a press brake, comprising the steps of:
establishing a program and entering into a controller a set of ram closed and ram open position designating signals representative of a series of positions to be reached and temporarily maintained, in a sequence, by the press brake ram;
locating a workpiece between dies of the press brake and actuating the ram to make the first bend;
limiting the closing stroke of the ram according to the first ram closing position designating signal entered in the controller;
opening the ram and limiting the return stroke according to the first ram open position designating signal entered in the controller;
relocating the workpiece between the dies;
actuating the ram toward the workpiece in the second position to make another bend;
closing the ram to the limit predetermined according to the ram closing position designating signal entered into the controller for said another bend;
returning the ram to a limit predetermined according to the ram open limit position designating signal entered into the controller to follow said another bend;
and continuing to reposition the workpiece after opening the ram on succeeding closure thereof to make additional bends in the workpiece, and limiting the length of return stroke of the ram following succeeding bends according to the program entered into the controller.

12. The method of claim 11 wherein:
the step of limiting the closing stroke includes substituting the output of the controller for the end of closing stroke limit switch of the press brake as the source of end of closing stroke signal, and substituting the output of the controller for the end of opening stroke of the press brake as a source of end of opening stroke signal.

13. The method of claim 11 and further comprising:
the step of, prior to establishing a program, referencing ram opening travel from ram closed position.

14. The method of claim 13 wherein said referencing step comprises;
generating pulses in response to ram closure and opening and so entering said pulses in a counter as to cause said counter to count down as said ram closes and count up as said ram opens and limiting the count down at zero.

15. The method of claim 14 wherein said referencing step includes:
entering and maintaining a zero in said counter during closure of said ram until said ram is closed, and then counting up as the rams opens.

16. The method of claim 15 wherein the ram is referenced at zero with the workpiece in the space between a fixed and movable die of the press brake.

17. The method of claim 15 wherein the ram is referenced at zero with a fixed and movable die in contact with each other.

18. The method of claim 15 wherein:
the referencing step is performed during a calibrate mode of operation, and the program is established during a run mode of operation.

19. A method of making a series of bends in a workpiece in a press brake, comprising the steps of:
establishing a program by mutually entering into a controller a set of gauge position designating signals representative of locations to be reached and temporarily maintained, in a sequence, by a workpiece positioning stop, and by manually entering into a controller a set of ram closed and ram open position designating signals representative of a series of positions to be reached and temporarily maintained, in a sequence, by the press brake ram;
coordinating the gauge position designating signals with the ram position designating signals at each step in the sequence;
locating a workpiece against the stop and between dies of the press brake and actuating the ram to make the first bend;
releasing the ram and limiting the closing stroke according to the first ram closing position designating signal;
releasing the ram and limiting the return stroke according to the first ram open position designating signal entered for the ram;
moving the stop to the second position;

locating the workpiece against the stop in the second position;

actuating the ram toward the workpiece in the second position to make the second bend;

closing the ram to the limit predetermined according to the ram closing position designating signal entered into the controller for the second bend;

returning the ram to a limit predetermined according to the second ram open position designating signal entered to follow the second bend;

and continuing the reposition the stop after each ram closing, and repositioning the workpiece against the stop after opening the ram each time; and limiting the depth of the ram stroke and return for each ram actuation according to the program entered into the controller.

20. The method of claim 19 wherein the step of manually entering a set of ram open position designating signals includes the step of:

manually adjusting a set of multiposition thumbwheel operated switches in a plurality of different groups numbering at least as many as there are bends for which different ram open positions are to follow, adjusting the switches in each group in accordance with a dimension representing ram open position, to be attained following a bend.

21. The method of claim 19 and further comprising:

the step of, prior to establishing a program, referencing ram opening travel from ram closed position.

22. The method of claim 21 wherein said referencing step comprises:

generating pulses in response to ram closure and opening and so entering said pulses in a counter as to cause said counter to count down as said ram closes and count up as said ram opens and limiting the count down at zero.

23. The method of claim 22 wherein said referencing step includes:

entering and maintaining a zero in said counter during closure of said ram until said ram is closed, and then counting up as the ram opens.

24. The method of claim 23 wherein the ram is referenced at zero with the workpiece in the space between a fixed and movable die of the press brake.

25. The method of claim 23 wherein the ram is referenced at zero with a fixed and movable die in contact with each other.

26. Apparatus for controlling the ram of a hydraulic press brake during the procedure of making a series of bends in a workpiece; said apparatus comprising:

establishing means for establishing a program for variably limiting the travel of a ram of a press brake at different steps in the series for workpiece bends having different parameters, first and second signal outputs, said first output being for a ram closing limit signal and the second output being for a ram opening limit signal;

ram position indicating signal generating means having an output;

and signal comparing means having inputs coupled to said generating means and to said establishing means for detecting a match between signals from said generating means and signals from switches during opening and closing movement indicating signals from said signal generating means, to generate a ram stop signal at said first output when a match is made during indication of ram closing movement, and to generate a ramp stop signal at said second output when a match is made during indication of ram opening movement.

* * * * *